US012791866B2

(12) United States Patent
Zhang

(10) Patent No.: US 12,791,866 B2
(45) Date of Patent: Nov. 10, 2026

(54) HEAD-MOUNTED DISPLAY DEVICE

(71) Applicant: MATRIXED REALITY TECHNOLOGY CO., LTD., Wuxi (CN)

(72) Inventor: Tongfu Zhang, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 76 days.

(21) Appl. No.: 18/856,607

(22) PCT Filed: Apr. 11, 2023

(86) PCT No.: PCT/CN2023/087697
§ 371 (c)(1),
(2) Date: Oct. 12, 2024

(87) PCT Pub. No.: WO2023/198081
PCT Pub. Date: Oct. 19, 2023

(65) Prior Publication Data

US 2025/0251608 A1 Aug. 7, 2025

(30) Foreign Application Priority Data

Apr. 12, 2022 (CN) ......................... 202210380875.3

(51) Int. Cl.
*G02B 27/00* (2006.01)
*G02B 27/01* (2006.01)
*G06F 1/16* (2006.01)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC ............ G02B 27/0176; G02B 27/0172; G02B 27/0179; G02B 2027/013; G02B 2027/0159; G02B 27/01; G06F 1/163
See application file for complete search history.

(56) References Cited

U.S. PATENT DOCUMENTS 6,215,460 B1 * 4/2001 Mizoguchi ......... G02B 27/0172 348/E13.041
6,424,321 B1 * 7/2002 Ronzani ............. G02B 27/0176 345/87
(Continued)

FOREIGN PATENT DOCUMENTS

CN 201096988 Y 8/2008
CN 201369252 Y 12/2009
(Continued)

OTHER PUBLICATIONS

CN 216145028 U.*
(Continued)

*Primary Examiner* — Rockshana D Chowdhury
(74) *Attorney, Agent, or Firm* — K&L Gates LLP

(57) ABSTRACT

A head-mounted display device includes a head-mounted component, a display part, two cantilever arms, and a synchronous transmission mechanism, wherein the display part includes a housing and a positioning base; ends of the two cantilever arms in a first direction are respectively rotatably connected to two sides of the head-mounted component; the synchronous transmission mechanism includes a middle transmission component accommodated in the housing and two side transmission components at least partially accommodated in the housing, two ends of each side transmission component being respectively connected to the middle transmission component and one of the two cantilever arms; the positioning base is configured to be rotatably connected to the middle transmission component and pre-
(Continued)

vent displacement of the middle transmission component relative to the housing; and the synchronous transmission mechanism is configured such that when one cantilever arm rotates, the synchronous transmission mechanism causes the other cantilever arm to rotate synchronously.

20 Claims, 7 Drawing Sheets

(52) U.S. Cl.
CPC .................. *G02B 2027/013* (2013.01); *G02B 2027/0159* (2013.01); *G06F 1/1673* (2013.01)

(56) References Cited

U.S. PATENT DOCUMENTS

| | | | | |
|---|---|---|---|---|
| 7,753,520 | B2 * | 7/2010 | Fuziak, Jr. | G02C 5/001 351/158 |
| 7,786,954 | B2 * | 8/2010 | Mizuuchi | G02B 7/12 345/8 |
| 10,228,727 | B1 * | 3/2019 | Pickett | A45F 5/00 |
| 10,539,792 | B1 | 1/2020 | Tompkins et al. | |
| 10,617,025 | B1 * | 4/2020 | Chen | G02B 27/0176 |
| 10,747,005 | B1 | 8/2020 | Sullivan | |
| 10,901,225 | B1 * | 1/2021 | De Nardi | G02B 27/0093 |
| 11,561,578 | B2 * | 1/2023 | Hudman | G06F 1/163 |
| 11,762,421 | B2 * | 9/2023 | Hatfield | G02B 27/0176 345/8 |
| 11,762,422 | B1 * | 9/2023 | Zimmerman | G02B 27/0176 361/807 |
| 2011/0127305 | A1 * | 6/2011 | Yates | G02B 7/002 224/181 |
| 2013/0194682 | A1 * | 8/2013 | Sahu | G02B 27/022 359/804 |
| 2014/0157496 | A1 * | 6/2014 | Ginther | A61F 9/029 2/439 |
| 2016/0334627 | A1 * | 11/2016 | Yang | G02B 27/0172 |
| 2017/0153456 | A1 | 6/2017 | Huang et al. | |
| 2018/0321707 | A1 * | 11/2018 | Hu | G06F 1/163 |
| 2018/0338130 | A1 * | 11/2018 | Miller | H04N 13/327 |
| 2019/0212772 | A1 * | 7/2019 | Chen | G06F 1/1656 |
| 2019/0346682 | A1 * | 11/2019 | Kang | G02B 27/0176 |
| 2021/0103150 | A1 * | 4/2021 | Tempel | G06F 3/011 |
| 2021/0337288 | A1 * | 10/2021 | Peng | H04R 5/0335 |
| 2022/0326730 | A1 * | 10/2022 | Ashida | G02B 27/02 |
| 2023/0288711 | A1 * | 9/2023 | Gallaher | G02C 11/06 |

FOREIGN PATENT DOCUMENTS

| | | | |
|---|---|---|---|
| CN | 204763738 | U | 11/2015 |
| CN | 204883056 | U | 12/2015 |
| CN | 205027953 | U | 2/2016 |
| CN | 106628896 | A | 5/2017 |
| CN | 207148433 | U | 3/2018 |
| CN | 109143588 | A | 1/2019 |
| CN | 208547771 | U | 2/2019 |
| CN | 110941094 | A | 3/2020 |
| CN | 211014862 | U | 7/2020 |
| CN | 112748574 | A | 5/2021 |
| CN | 213149377 | U | 5/2021 |
| CN | 113267892 | A | 8/2021 |
| CN | 214249189 | U | 9/2021 |
| CN | 214375576 | U | 10/2021 |
| CN | 216145028 | U | 3/2022 |
| CN | 114675423 | A | 6/2022 |
| CN | 216956530 | U | 7/2022 |
| KR | 20170139227 | A | 12/2017 |

OTHER PUBLICATIONS

ISR Received in PCT/CN2023/087697; mailed May 24, 2023.
First OA received in CN Application No. 202210380875.3; mailed May 23, 2023.
Second OA received in CN Application No. 202210380875.3; mailed Oct. 25, 2023.
Rejection Decision received in CN Application No. 202210380875.3; mailed Mar. 15, 2024.

* cited by examiner

HEAD-MOUNTED DISPLAY DEVICE

CROSS-REFERENCES TO RELATED APPLICATIONS

The present disclosure is a national phase application of International Application No. PCT/CN2023/087697, filed on Apr. 11, 2023, which claims priority to Chinese patent application No. 202210380875.3, filed with Chinese Patent Office on Apr. 12, 2022, which is incorporated herein by reference in its entirety.

FIELD

The present disclosure relates to the technical field of electronic products, in particular to a head-mounted display device.

BACKGROUND

A head-mounted display device is a device that can be worn on a user's head and has a display function, such as augmented reality glasses, virtual reality glasses, mixed reality glasses, etc., with powerful functions supported by software, and is deeply loved by users. The head-mounted display device generally includes a head-mounted component, two cantilever arms, and a display part. The two cantilever arms each have first ends respectively connected to two sides of the head-mounted component, and second ends respectively connected to two sides of the display part. The two cantilever arms are rotatable relative to both the head-mounted component and the display part to adjust a height and an angle of the display part relative to the eyes of a user.

SUMMARY

Embodiments of the present disclosure provide a head-mounted display device.

In order to achieve the above object, the present disclosure provides the following technical solution: the present disclosure provides a head-mounted display device including a head-mounted component, a display part, two cantilever arms, and a synchronous transmission mechanism. The head-mounted component is configured to provide a head wearing space; the display part includes a housing and a positioning base fixedly connected to the housing; ends of the two cantilever arms in a first direction are respectively rotatably connected to two sides of the head-mounted component, and ends of the two cantilever arms in a second direction are respectively rotatably connected to two sides of the housing; the synchronous transmission mechanism includes a middle transmission component accommodated in the housing and two side transmission components at least partially accommodated in the housing, two ends of each side transmission component being respectively connected to the middle transmission component and one of the two cantilever arms; the positioning base is configured to be rotatably connected to the middle transmission component and prevent displacement of the middle transmission component relative to the housing; and the synchronous transmission mechanism is configured such that when one cantilever arm rotates, the synchronous transmission mechanism causes the other cantilever arm to rotate synchronously.

The technical solution of the present disclosure is further described in detail below in conjunction with the accompanying drawings and embodiments.

BRIEF DESCRIPTION OF THE DRAWINGS

The drawings constituting a part of the specification describe embodiments of the present disclosure, and together with the description, serve to explain the principle of the present disclosure.

With reference to the accompanying drawings, the present disclosure can be understood more clearly according to the following detailed description, in which.

Figure 1:
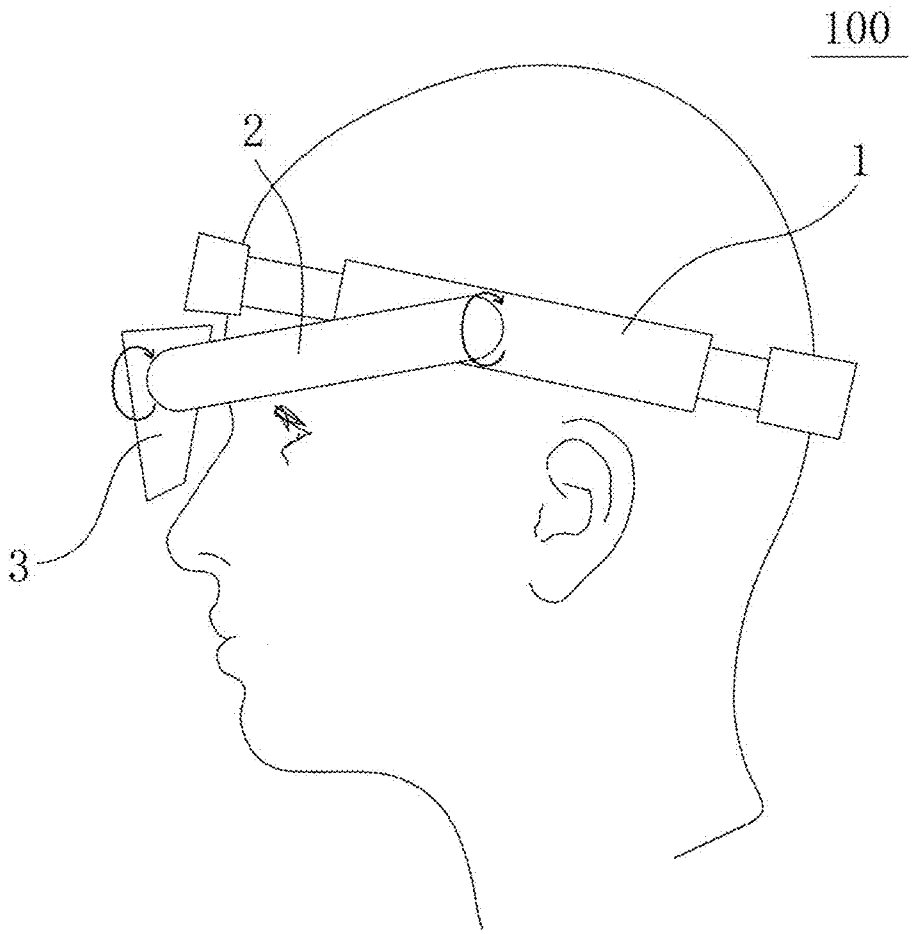
FIG. 1 shows a schematic view of a user wearing a head-mounted display device provided by embodiments of the present disclosure.

Reference numerals: 100, head-mounted display device; 1, head-mounted component; 11, head wearing space; 2, cantilever arm; 3, display part; 31, housing; 311, main wall; 312, side wall; 32, positioning base; 32*a*, clamping slot; 33, optical imaging system; 331, image source assembly; 332, arc-shaped lens; 333, flat lens; 4, synchronous transmission mechanism; 41, middle transmission component; 411, shaft body; 412, fourth universal joint; 413, second gear; 414, second synchronous belt pulley; 42, side transmission component; 421, end member; 421*a*, first universal joint; 421*b*, first gear; 421*c*, first synchronous belt pulley; 421*d*, external thread; 422, transmission member; 422*a*, second universal joint; 422*b*, third universal joint; 422*c*, first bevel gear; 422*d*, second bevel gear; 422*e*, synchronous belt; 423, first cross shaft; 424, second cross shaft; 5, damping component; 51, nut; 52, fixing part; 53, friction plate; 54, disc spring; 6, counterweight block.

It is to be noted that these drawings and text description are not intended to limit the scope of conception of the present disclosure in any way, but to explain the concepts of the present disclosure for those skilled in the art by referring to specific embodiments.

DETAILED DESCRIPTION OF THE DISCLOSURE

To make the object, technical solution and advantages of embodiments of the present disclosure clearer, the technical solution in the embodiments will be described below clearly and completely with reference to the drawings in the embodiments of the present disclosure. The following embodiments are used for illustrating the present disclosure, but not limiting the scope of the present disclosure.

In description of the present disclosure, it is to be noted that such terms "upper", "lower", "inner", "outer", etc. that denote orientation or location relations are based on orientation or location relations illustrated in the drawings, and are only intended to facilitate describing the present disclosure and simplify description, instead of indicating or implying the denoted apparatuses necessarily have specific orientations or are constructed and operated in specific orientations, and thus they should not be construed as limiting the present disclosure.

In description of the present disclosure, it is to be noted that unless otherwise explicitly specified and defined, the terms "mount" and "connect" should be construed broadly. For example, such a term may denote fixed connection, or detachable connection, or integrated connection; mechanical connection, or electric connection; direct connection, or indirect connection via an intermediate medium. For those of ordinary skill in the art, specific meanings of the above terms in the present disclosure may be understood based on specific circumstances.

Figure 3:
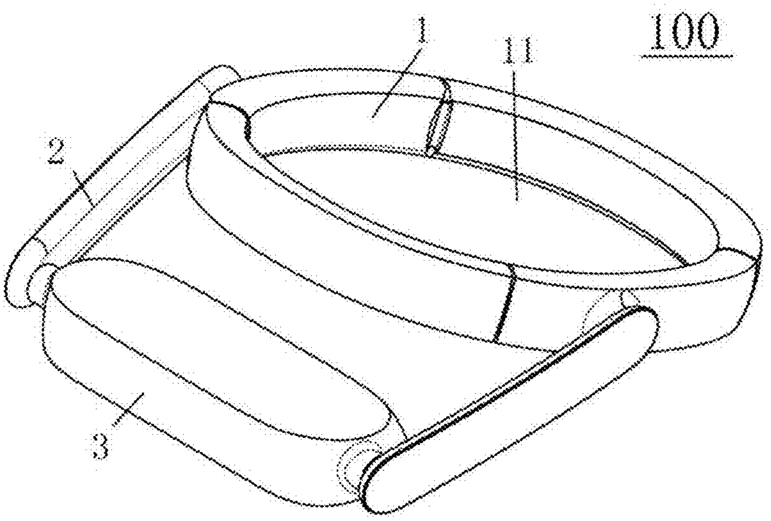
FIG. 3 shows a schematic view of a head-mounted display device provided by embodiments of the present disclosure, a display part of which is rotated to a horizontal state.
Figure 5:
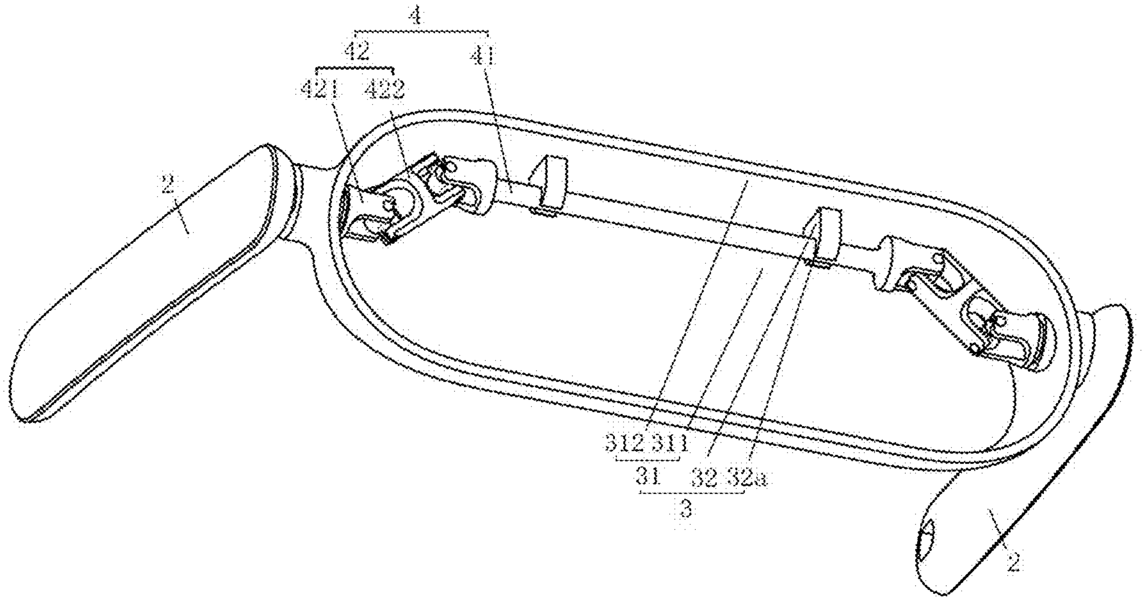
FIG. 5 shows a schematic structural view of a head-mounted display device provided by embodiments of the present disclosure on which a first type of synchronous transmission mechanism is mounted (only some components are shown for ease of illustration)

Referring to FIGS. 3 and 5, embodiments of the present disclosure provide a head-mounted display device 100 including a head-mounted component 1, a display part 3, two cantilever arms 2, and a synchronous transmission mechanism 4. The head-mounted component 1 is configured to define a head wearing space 11. For example, referring to FIG. 1, the head-mounted component 1 may be in an annular shape, and may be sleeved on the head of a wearer. The display part 3 may include a housing 31 and a positioning base 32 fixedly connected to the housing 31. Ends of the two cantilever arms 2 in a first direction are respectively rotatably connected to two sides of the head-mounted component 1, and ends of the two cantilever arms 2 in a second direction are respectively rotatably connected to two sides of the housing 31. The synchronous transmission mechanism 4 includes a middle transmission component 41 accommodated in the housing 31, and two side transmission components 42 at least partially accommodated in the housing 31. Two ends of each side transmission component 42 may be respectively connected to the middle transmission component 41 and one of the two cantilever arms 2. The positioning base 32 is configured to be rotatably connected to the middle transmission component 41 and prevent displacement of the middle transmission component 41 relative to the housing 31. The synchronous transmission mechanism 4 is configured such that when one cantilever arm 2 rotates, the synchronous transmission mechanism 4 can cause the other cantilever arm 2 to rotate synchronously.

It is to be noted that the above terms "first direction" and "second direction" may be understood as two directions along a length of a cantilever arm 2. For example, a direction along the cantilever arm 2 from the display part 3 toward the head-mounted component 1 is the first direction, and a direction along the cantilever arm 2 from the head-mounted component 1 toward the display part 3 is the second direction.

In use of the head-mounted display device 100 of the present disclosure, the two cantilever arms 2 are rotatable relative to both the head-mounted component 1 and the display part 3 to adjust a height and an angle of the display part 3 relative to the eyes of a wearer. Of components in the synchronous transmission mechanism 4, i.e., of components in the middle transmission component 41 and the side transmission component 42, adjacent two are almost all in rigid fit with each other. To adjust pitch angles of the cantilever arms 2, a wearer may rotate a cantilever arm 2 on a first side with one hand. Then, the cantilever arm 2 on the first side causes a side transmission component 42 on the first side to move, the side transmission component 42 on the first side further causes the middle transmission component 41 to move, and the middle transmission component 41 causes a side transmission member 422 on a second side to move. Finally, the side transmission member 422 on the second side causes a cantilever arm 2 on the second side to rotate synchronously with the cantilever arm 2 on the first side. The cantilever arm 2 on the second side and the cantilever arm 2 on the first side are rotated at a same angle, such that the display part 3 is stably supported, with two sides of the display part 3 being substantially at a same height, without skewing, so the AR viewing effect is good.

It is to be noted that the terms "first side" and "second side" above may be understood as two sides of the head of a human body, i.e., a left side and a right side, in a state where the head-mounted display device 100 is worn on the head of the human body.

Figure 12:
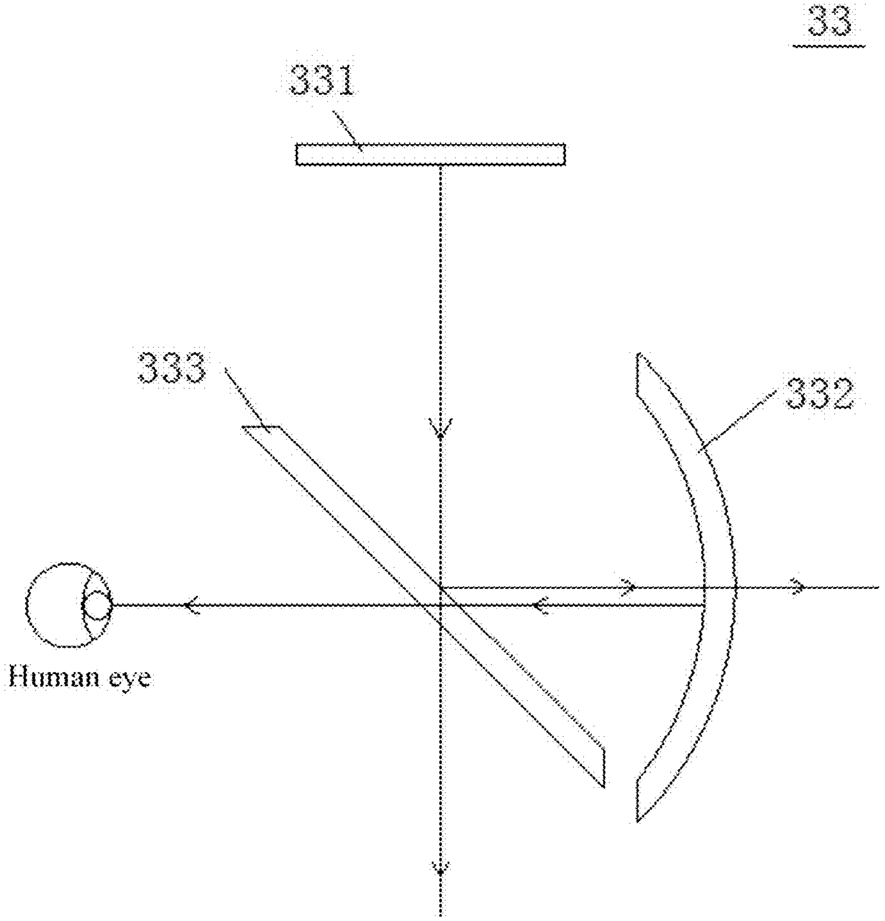
FIG. 12 shows a schematic view of an optical imaging system of a head-mounted display device provided by embodiments of the present disclosure.

The display part 3 may further include an optical imaging system 33. For example, referring to the optical imaging system 33 shown in FIG. 12 at least partially accommodated in the housing 31, the optical imaging system 33 may include an image source assembly 331 and an optical assembly. The image source assembly 331 is configured to emit light capable of forming an image. The optical assembly is configured to change a light path of the light emitted by the image source assembly 331 and project the light toward a direction of a first side of the image source assembly 331, so that the light can be projected into a user's eye to form an image in the eye of the user when the head-mounted display device 100 is worn on the head of the user. The optical assembly may include an arc-shaped lens 332 and a flat lens 333. Referring to FIG. 12, which illustrates a feasible optical solution, the image source assembly 331 may project light in a vertical direction. The flat lens 333 can refract the light emitted by the image source assembly 331 and then project it toward the direction of the second side. The arc-shaped lens 332 reflects the light projected by the flat lens 333 and then projects it toward the direction of the first side. The light can pass through the flat lens 333 and be projected into a user's eye when the user wears the head-mounted display device 100, thus forming a virtual image in the user's field of view. Wearing the head-mounted display device, the user sees both a real world and a virtual picture added to the real world. For example, a virtual cartoon character is placed on a table in the real world, or virtual images and videos, etc. are displayed in the visual field.

In an example, the two side transmission components 42 may be respectively provided on two sides of the middle transmission component 41. Ends adjacent to each other of the two side transmission components 42 are respectively in transmission connection with two ends of the middle transmission component 41. Ends away from each other of the two side transmission components 42 are respectively in transmission connection with the two cantilever arms 2, so that the ends of the two cantilever arms 2 in the second direction are respectively rotatably connected to the two sides of the housing 31.

Figure 2:
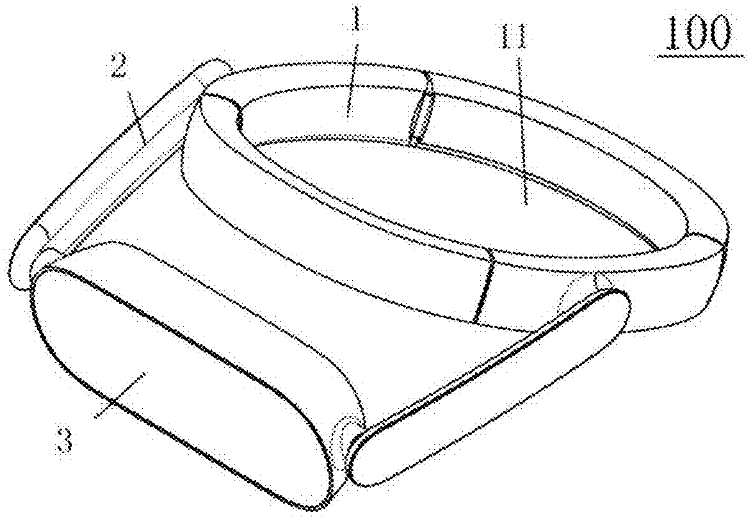
FIG. 2 shows a schematic view of a head-mounted display device provided by embodiments of the present disclosure.
Figure 4:
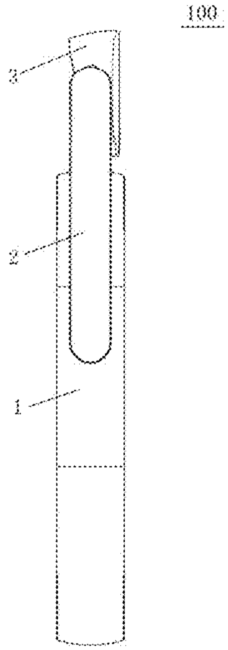
FIG. 4 shows a schematic view of a head-mounted display device provided by embodiments of the present disclosure in a storage state.

Referring to FIGS. 2, 3 and 4, the head-mounted display device provided by embodiments of the present disclosure has a storage state and a use state. Referring to FIGS. 1 and 2, in the use state, there is an included angle between the display part 3 and a plane in which the two cantilever arms 2 are located. Referring to an arrow on a left side in FIG. 1, a wearer may rotate the angle of the display part 3 as needed. It is to be noted that, in conjunction with FIG. 5, the housing 31 may have a flat structure with two main walls 311 arranged sequentially in a thickness direction. That there is an included angle between the display part 3 and a plane in which the two cantilever arms 2 are located, as defined above, may be understood as that there is an included angle between a plane in which a main wall 311 is located (e.g., a front side of the display part 3) and the plane in which the two cantilever arm 2 are located. Referring to FIGS. 3 and 4, when the head-mounted display device is in the storage state, the display part 3 is flipped to be located in the same plane as the two cantilever arms 2, which may also be understood as that a main body of the display part 3 and the two cantilever arms 2 extend substantially in a same direction, which reduces a storage volume, and facilitates placement into a packaging box. Exemplarily, the head-mounted component 1 is in an annular shape. When the head-mounted display device needs to be stored, the display part 3 may be rotated and the cantilever arms 2 may be rotated toward a side of the head-mounted component 1 until the display part 3, the cantilever arms 2, and the annular head-mounted component 1 may be located in a same plane, which may also be understood as that the main body of the display part 3, the two cantilever arms 2, and the head-mounted component 1 extend substantially in a same direction. Referring to FIG. 4, the head-mounted display device 100 in the storage state is flat overall, may be suitable to be accommodated in a flat box, occupies a small space, and is convenient to carry.

Figure 6:
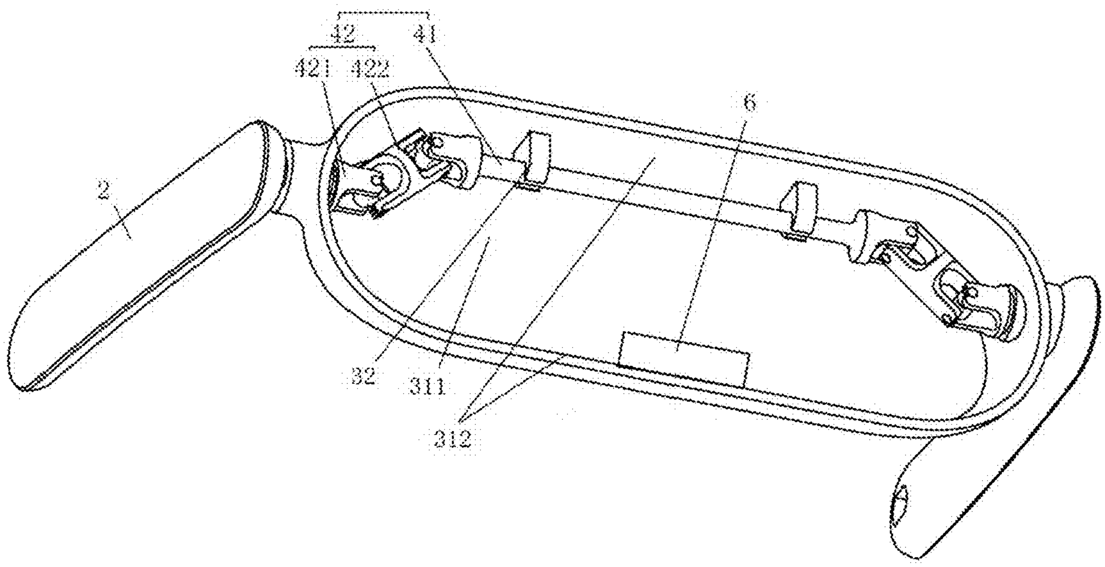
FIG. 6 shows a schematic structural view of a head-mounted display device provided by embodiments of the present disclosure in which a counterweight block is provided.
Figure 7:
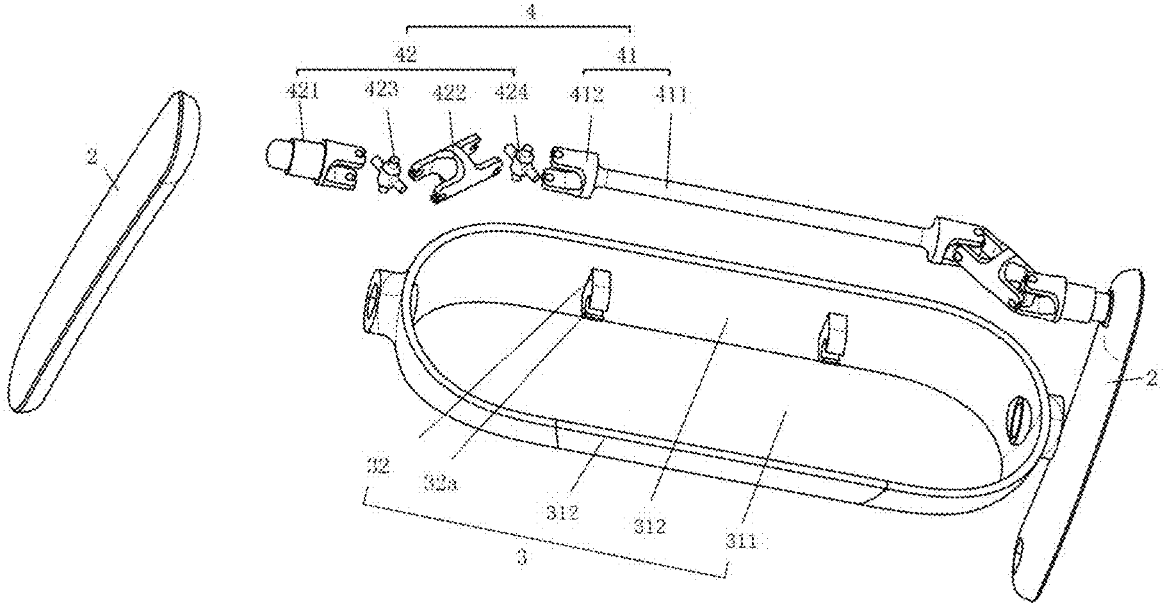
FIG. 7 shows an exploded view of a head-mounted display device (some components) provided by embodiments of the present disclosure.

Referring to FIGS. 5, 6, and 7, in a possible embodiment, the positioning base 32 of the head-mounted display device is connected to an inner wall of the housing 31, and the positioning base 32 is provided with a clamping slot **32*a*. The middle transmission component 41 includes a shaft body 411. The shaft body 411 is rotatably clamped in the clamping slot 32*a***.

In this embodiment, the positioning base 32 is configured to be rotatably connected to the shaft body 411, which can prevent the shaft body 411 from moving relative to the housing 31, only allows the shaft body 411 to self-rotate around its own axis. When a wearer rotates the display part 3 to adjust its angle, the middle transmission component 41 inside can be caused to move together, and the middle transmission component 41 does not move relative to the housing 31 and is not liable to interfere with components accommodated inside the housing 1, allowing the housing 31 to be rotated to the storage state of being located in the same plane as the two cantilever arms 2.

In embodiments of the present disclosure, the number of positioning base 32 is not specifically limited. There may be one or more positioning bases 32. In the case where only one positioning base 32 is provided, it suffices to ensure that two ends of the shaft body 411 are stable. For example, a length of the positioning base 32 may be extended to increase a length of contact between the positioning base 32 and the shaft body 411.

It is to be noted that the positioning base 32 of the present disclosure may also be constructed in other shapes, in principle as long as it satisfies that the positioning base 32 and the housing 31 are fixedly connected to each other, and that the positioning base 32 can be connected to the shaft body 411, allowing the shaft body 411 to rotate around its own axis, but not allowing displacement of the shaft body 411 relative to the housing 31. Exemplarily, the shaft body 411 may be not in direct contact with the positioning base 32. A bearing may be mounted in the clamping slot **32*a* of the positioning base 32, and the shaft body 411 is passed through the bearing. Rotational resistance of the shaft body 411** is reduced by providing the bearing.

Referring to FIG. 7, the clamping slot **32*a* may include a circular through slot and a notch in communication with the circular slot. The shaft body 411 of the middle transmission component 41 may be passed through the notch and placed into the circular slot. The shaft body 411 may be rotated around the circular slot. The positioning base 32 may be made of a material with a low deformation capacity. For example, the positioning base 32 may be a plastic structure. A width of the notch may be slightly smaller than a cross-sectional diameter of the shaft body 411. To install the middle transmission component 41, the shaft body 411 may be aligned with the notch, and a squeezing force is applied so that the shaft body 411 extends into the notch, causing the notch to be propped up and deformed. When the shaft body 411 is fully slid into the circular through slot, the notch of the positioning base 32 is restored from the deformation, and the width of the notch is restored to be smaller than the cross-sectional diameter of the shaft body 411, such that the shaft body 411 will not be easily detached from the clamping slot 32*a***.

Optionally, two or even more positioning bases 32 may be provided on the inner wall of the housing 31. The positioning bases 32 are sequentially arranged in a length direction of the housing 31. The shaft body 411 of the middle transmission component 41 is passed through the clamping slots **32*a* of the positioning bases 32, respectively. The design of the plurality of positioning bases 32 improves the assembly stability of the middle transmission component 41 and prevents the middle transmission component 41 from skewing inside the housing 31**.

In a possible embodiment, referring to FIGS. 5, 6, and 7, the housing 31 of the display part 3 includes a main wall 311 and a side wall 312. The side wall 312 may be provided circumferentially around an edge of the main wall 311. The side wall 312 and the main wall 311 enclose a cavity, and at least part of the optical imaging system 33 and at least part of the synchronous transmission mechanism 4 can be accommodated in the cavity. The positioning base 32 is located in the cavity, and the positioning base 32 is connected to the side wall 312. The housing 31 may have an elongate box-like structure overall, and the housing 31 may include two main walls 311, which may be designated here as an inner main wall and an outer main wall, respectively. The inner main wall may be provided with an avoidance port for the optical imaging system to project light. The inner main wall needs to face towards the face of a human body when the head-mounted display device 100 is worn on the head. The outer main wall may be located on a side away from the face of the human body, which may be understood as a front side of the display part 3. The inner main wall and the side wall enclose a cavity and an opening in communication with the cavity, and the outer main wall 311 may be connected to the side wall 312 to close the opening. In embodiments of the present disclosure, the positioning base 32 is provided on the side wall 312, and correspondingly the middle transmission component 41 is mounted on a side in the cavity close to the side wall 312, and the middle transmission component 41 occupies a smaller space in the cavity of the housing 31, leaving a larger space in the middle to conveniently accommodate structural components of the optical imaging system 33 and other components of the head-mounted display device.

In a possible embodiment, referring to FIGS. 5, 6, and 7, each of the two side transmission components 42 includes an end member 421 and a transmission member 422. The end member 421 is rotatably connected to the housing 31, and the end member 421 is connected to the cantilever arm 2. The transmission member 422 is located between the end member 421 and the middle transmission component 41, and the transmission member 422 is in transmission connection with the end member 421 and the middle transmission component 41, respectively. There is an included angle between the transmission member 422 and the middle transmission component 41, and there is an included angle between the transmission member 422 and the end member 421.

In this embodiment, through slots in communication with the cavity are respectively provided at two ends of the housing 31 in the length direction, and the end members 421 of the two side transmission components 42 are both passed through the through slots and are in rotatable fit with the through slots. The middle transmission component 41 and the transmission member 422 are entirely located in the cavity, and an end of the end member 421 extending out of the cavity is connected to the cantilever arm 2. It is to be noted that the end member 421 and the cantilever arm 2 can rotate synchronously, without play therebetween in a rotation direction, and they remain relatively stationary in the rotation direction indicated by the arrow on the left side in FIG. 1. To keep the end member 421 and the cantilever arm 2 stationary in the rotation direction, the end member 421 and the cantilever arm 2 may be connected in an interference-fit manner, fixedly connected in a clamping manner, or fixed by a fastener, as long as it is ensured that they are stationary relative to each other in the rotation direction. In a non-rotation direction, such as in a direction of an axis of the end member 421, there may be relative motion between the end member 421 and the cantilever arm 2. For example, the cantilever arm 2 may be splayed outwardly relative to the end member 421. When the head-mounted display device 100 is worn by users with different head circumferences, the two cantilever arms 2 may be adaptively splayed outwardly or drawn inwardly after a head circumference size of the head-mounted component 1 is adjusted. The end member 421 and the cantilever arm 2 can together be rotated relative to a head ring in a direction indicated by an arrow on the right side in FIG. 1. The housing 31 of the display part 3 can be rotated relative to the end member 421 to adjust a tilt angle of the display part 3.

The housing 31 may be substantially an elongate flat structure, and the side walls 312 have two length sides and two width sides. The two width sides are provided with the aforementioned through slots. One length side may be provided with the positioning base 32, so that the middle transmission component 41, after being mounted to the positioning base 32, is away from a central position in the housing 31. The middle transmission component 41 and the end member 421 are not in a same straight line. In order to achieve transmission connection between the middle transmission component 41 and the end member 421, the transmission member 422 is arranged in an inclined manner, and the transmission member 422 is inclined sequentially from a width side of the side wall 312 toward a length side of the side wall 312, and is connected to the end member 421 and the middle transmission component 41, respectively. The middle transmission component 41, and the two end members 421 and the two transmission members 422 on the two sides of the middle transmission component 41 are arranged to form a substantially U-shaped structure overall. Two sides of the U-shape are flared outwardly. The synchronous transmission mechanism 4 can take up as little internal space as possible in the housing 31, so that more components, such as the optical imaging system 33, chips and circuitry, etc., can be accommodated in the housing 31.

Figure 8:
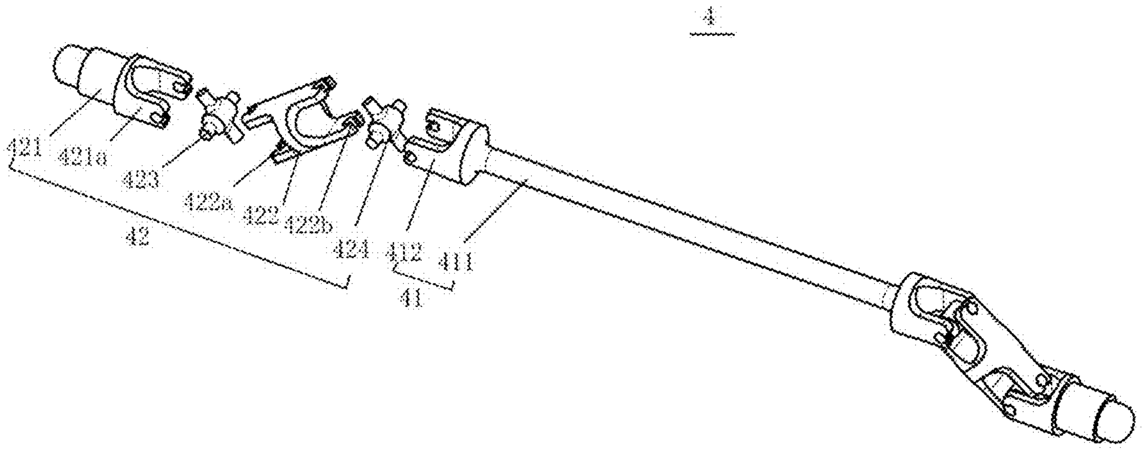
FIG. 8 shows a schematic structural view of a first type of synchronous transmission mechanism of a head-mounted display device provided by embodiments of the present disclosure.

Referring to FIG. 8, in a possible embodiment, the end member 421 has a first universal joint 421*a*; two ends of the transmission member 422 are respectively provided with a second universal joint 422*a* and a third universal joint 422*b*; and each end of the middle transmission component 41 is provided with a fourth universal joint 412. The first universal joint 421*a* is connected to the second universal joint 422*a* by a first cross shaft 423, and the third universal joint 422*b* is connected to the fourth universal joint 412 by a second cross shaft 424.

In embodiments of the present disclosure, the synchronous transmission mechanism 4 uses a universal joint transmission method, which achieves variable-angle power transmission and changes a power transmission direction of the end member 421. The universal joint transmission method of the present disclosure uses a cross-shaft-type rigid universal joint, which is simple in structure and reliable in transmission, and has high transmission efficiency. Each universal joint is a rotating yoke structure, i.e., having two yokes spaced apart, and four shafts of a cross shaft are rotatably connected to four yokes of two universal joints. For example, each shaft of the cross shaft is connected to a corresponding yoke by means of a bearing. Of two adjacent universal joints, one causes the other to rotate by means of a cross shaft. During rotation of the components, the bearings can self-rotate to reduce friction. Because the side transmission components 42 on the two sides of the middle transmission component 41 of the present disclosure are structurally symmetrical, this ultimately results in a same rotation angle of the end members 421 on two sides of the synchronous transmission, and therefore results in synchronous movement of the cantilever arms 2 on the two sides of the display part 3.

Figure 10:
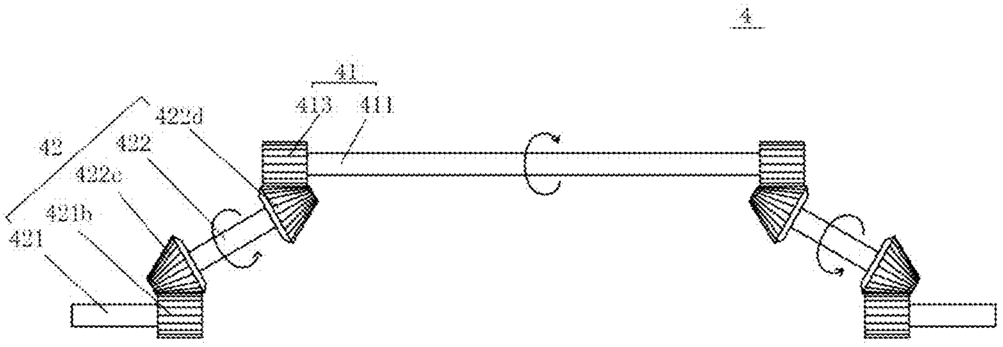
FIG. 10 shows a schematic structural view of a second type of synchronous transmission mechanism of a head-mounted display device provided by embodiments of the present disclosure.

Referring to FIG. 10, the synchronous transmission mechanism 4 of the present disclosure may also use a gear transmission scheme except the universal joint transmission scheme. Exemplarily, the end member 421 has a first gear 421*b*; two ends of the transmission member 422 are respectively provided with a first bevel gear 422*c* and a second bevel gear 422*d*; and each end of the middle transmission component 41 is provided with a second gear 413. The first gear 421*b* is engaged with the first bevel gear 422*c*, and the second bevel gear 422*d* is engaged with the second gear 413.

In this embodiment, the end member 421 may have a first shaft body. The first gear 421*b* is located in the cavity of the housing 31, and the first gear 421*b* is fixedly connected to the first shaft body. One end of the first shaft body extends out of the cavity and is connected to the cantilever arm 2. The first shaft body and the cantilever arm 2 can rotate around an axial direction of the first shaft body. The transmission member 422 includes a second shaft body. The first bevel gear 422*c* and the second bevel gear 422*d* are respectively provided at two ends of the second shaft body. The second shaft body is arranged in an inclined manner with respect to the first shaft body. A connecting base may be provided in the housing 31. The second shaft body is rotatably connected to the connecting base, and the second shaft body does not translate relate to the connecting base, to ensure that gears on both sides are maintained in a state of engagement with corresponding second bevel gears 422*d*, respectively. Alternatively, the housing 31 may be provided with a gear box. All gears on a same side of the synchronous transmission mechanism 4, i.e., the first gear 421*b*, the second gear 413, the first bevel gear 422*c*, and the second bevel gear 422*d*, may be mounted in the gear box, and the gears are maintained in a state of mutual engagement to ensure that power transmission is precise and there is no play. It is to be noted that the shapes of the first gear 421*b* and the second gear 413 are designed according to actual needs. For example, the first gear 421*b* and the second gear 413 may also be bevel gears. In this embodiment, the transmission components of the synchronous transmission mechanism 4 adopt gear transmission. Gear transmission is high in transmission precision and can ensure an accurate transmission ratio, and gear transmission works reliably and has a long service life.

Figure 11:
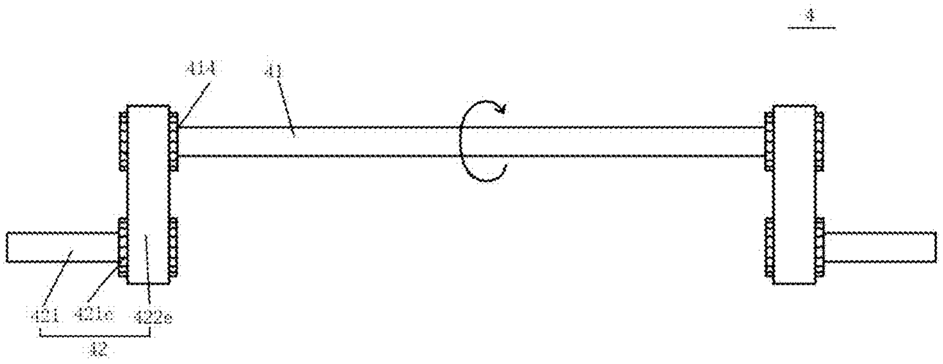
FIG. 11 shows a schematic structural view of a third type of synchronous transmission mechanism of a head-mounted display device provided by embodiments of the present disclosure.

Referring to FIG. 11, the synchronous transmission mechanism 4 of the present disclosure may also use a synchronous belt transmission scheme except the universal joint transmission scheme and the gear transmission scheme. Exemplarily, the end member 421 has a first synchronous belt pulley 421*c*; each end of the middle transmission component 41 is provided with a second synchronous belt pulley 414; and the transmission member 422 includes a synchronous belt 422*e* sleeved on the first synchronous belt pulley 421*c* and the second synchronous belt pulley 414.

Each synchronous belt pulley may be provided with a plurality of tooth grooves in a circumferential direction, and the synchronous belt 422*e* is uniformly provided with convex teeth in a length direction. The synchronous belt 422*e* is engaged with the synchronous belt pulley. In a power transmission process, power is transmitted mainly through the engagement of the convex teeth on the synchronous belt 422*e* with the tooth grooves on the synchronous belt pulley. The synchronous belt scheme used for power transmission in embodiments of the present disclosure has an accurate transmission ratio, no slippage, smooth transmission, and low noise. The end member 421 may include a first shaft body. The first synchronous belt pulley 421*c* may be located in the cavity of the housing 31, and the first synchronous belt pulley 421*c* is connected to the first shaft body. The first shaft body and the cantilever arm 2 can rotate integrally in a circumferential direction. The middle transmission component 41 includes a second shaft body. Two ends of the second shaft body are each provided with a second synchronous belt pulley 414, respectively. The first shaft body and the second shaft body are parallel to each other. The synchronous belt 422*e* does not need to be arranged in an inclined manner. The synchronous belt 422*e* is sleeved between the first synchronous belt pulley 421*c* and the second synchronous belt pulley 414. When a wearer rotates the cantilever arm 2 on the first side, the cantilever arm 2 on the first side will cause the first synchronous belt pulley 421*c* on the first side to rotate, and the first synchronous belt pulley 421*c* on the first side causes, through the synchronous belt 422*e* on the first side, the second synchronous belt pulley 414 on the first side to rotate, thereby causing the middle transmission component 41 to rotate. The rotation of the middle transmission component 41 then causes the second synchronous belt pulley on the second side to rotate, and the rotation of the second synchronous belt pulley on the second side causes, through the synchronous belt 422*e* on the second side, the first synchronous belt pulley 421*c* on the second side to rotate, thereby causing the cantilever arm 2 on the second side to move synchronously with the cantilever arm 2 on the first side.

In a possible embodiment, at least one of the end member 421 and the transmission member 422 of at least one of the two side transmission components 42, and the middle transmission component 41 is connected to the housing 31 by a damping component.

In this embodiment, due to providing the damping component, the resistance between the housing 31 and the synchronous transmission mechanism 4 is increased, so that the housing 31 after rotation can be kept relatively stationary with respect to the synchronous transmission mechanism 4, and the display part 3 after rotation can be kept at an adjusted position to provide a user with an optimal visual experience. After wearing the head-mounted display device 100, the user may rotate the cantilever arm 2 on one side with one hand, so that the cantilever arm 2 causes the end member 421 to rotate. Due to providing the damping component, the housing 31 and the end member 421 may have no relative movement or only slight relative movement, and the position of the housing 31 relative to the end member 421 and the cantilever arm 2 is kept substantially unchanged. After the angle of the cantilever arm 2 is adjusted in place, the user may overcome the resistance of the damping component and rotate the housing 31 so that the housing 31 is rotated relative to the end member 421. During the rotation of the housing 31, the housing 31 causes the middle transmission component 41 to rotate, which may be understood as revolving around a connecting line between the two end members 421 as an axis of rotation. During this process, the middle transmission component 41 itself also rotates, which may be understood as self-rotating on its own axis. Both of the "self-rotation" and "revolution" described above will occur during the rotation of the middle transmission component 41 caused by the housing 31, and the middle transmission component 41 causes the side transmission components 42 on both sides to rotate synchronously, so that the two sides of the housing 31 rotate at a same angle, and the housing 31 does not skew.

The following is detailed description with an example of providing a damping component 5 between the end member 421 and the housing 31.

Figure 9:
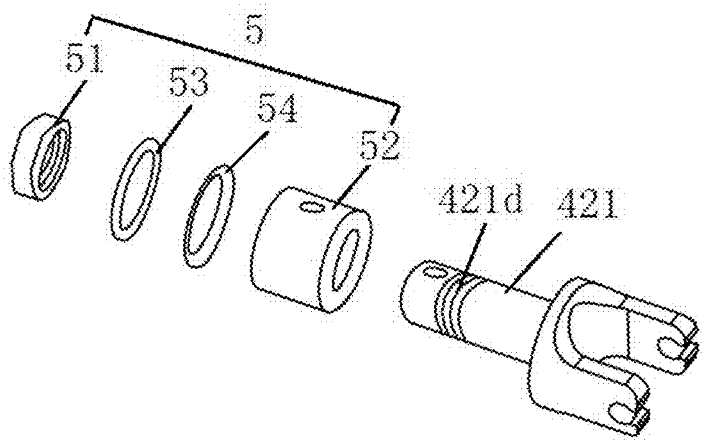
FIG. 9 shows an exploded view of a cooperating structure of an end member and a damping component of a synchronous transmission mechanism of a head-mounted display device provided by embodiments of the present disclosure.

Referring to FIG. 9, the end member 421 is provided with an external thread 421*d*, and the damping component 5 includes a nut 51, a fixing part 52, a friction plate 53, and a disc spring 54. The nut 51 is threaded connected to an external thread 421*d* on the end member 421. The fixing part 52 is sleeved on the end member 421, and the fixing part 52 is connected to the housing 31. For example, the fixing part 52 is provided with a first fixing hole, and is fixedly connected to the housing 31 through the first fixing hole. For example, a first fastener is passed through the housing 31 and connected to the first fixing hole in the fixing part 52 to fixedly connect the fixing part 52 to the housing 31. The end member 421 is provided with a second fixing hole, and is fixedly connected to the cantilever arm 2 through the second fixing hole. For example, the second fastener is passed through the cantilever arm 2 and connected to the second fixing hole to fix the cantilever arm 2 to the end member 421. The friction plate 53 and the disc spring 54 are both sleeved on the end member 421, and the friction plate 53 and the disc spring 54 are located between the nut 51 and the fixing part 52. By rotating the nut 51, the nut 51 may be adjusted closer to or further away from the fixing part 52 to adjust a damping force. When the housing 31 is rotated in the direction indicated by the arrow on the left side in FIG. 1, relative positions of the cantilever arm 2 and the end member 421 remain unchanged. When force application is stopped after the housing 31 is rotated at a certain angle, due to a large friction between the fixing part 52 and the end member 421, the fixing part 52 may be in a stationary state, and the positions of the housing 31 and the cantilever arm 2 may remain unchanged.

In an example, it is also possible to provide a damping shaft between the positioning base 32 and the middle transmission component 41, and the positioning base and the middle transmission component are in transmission connection by means of the damping shaft, which can also achieve that when the display part 3 is tilted at a certain angle, its tilt angle can be kept unchanged. Of course, in other embodiments of the present disclosure, it is also possible to provide damping devices between the transmission members 422 and the housing 31.

Referring to FIG. 6, in a possible embodiment, in order to control the display part 3 to remain in a particular position, a counterweight block 6 may be provided on the housing 31 in embodiments of the present disclosure. The counterweight block 6 is provided on one side of the housing 31 in a width direction, and the counterweight block 6 is located at a middle position on the housing 31 in a length direction. After the cantilever arm 2 is rotated relative to the head-mounted component 1, the display part 3 automatically rotates relative to the cantilever arm 2 under the action of the counterweight block. That is, under the gravity of the counterweight block, the housing 3 is caused to rotate relative to the cantilever arm 2, the housing 3 causes the middle transmission component 41 to rotate together around the axis of the end members 421, at the same time, the middle transmission component 41 rotates along its own axis, and finally, the two sides of the housing 31 rotate around the axis of the end members 421 at a same angle.

As previously described, the side wall 312 has two length sides and two width sides. The two width sides are provided with the aforementioned through slots. One length side is provided with the positioning base 32, so that the middle transmission component 41, after being mounted to the positioning base 32, is away from a central position in the housing 31. In embodiments of the present disclosure, the counterweight block 6 may be mounted on the other length side of the side wall 312 and located at a middle position on the length side. When the cantilever arm 2 is rotated relative to the head-mounted component 1, the display part 3 automatically rotates relative to the cantilever arm 2 under the action of the counterweight block. Finally, a side on which the counterweight block is located is a bottom-most side of the housing 31, and meanwhile, the inner main wall of the housing 31 provided with the avoidance port for the optical imaging system to project light faces towards the side of a wearer's face. By providing the counterweight block 6, the head-mounted display device 100 of the present disclosure can directly and automatically adjust the angle of the housing 31 without requiring the wearer's operation, which improves an experience effect.

The cantilever arm 2 and the head-mounted component 1 of the head-mounted display device 100 of the present disclosure may be in transmission connection by a damping shaft, so that when the cantilever arm 2 is rotated to a certain angle, its position can be kept unchanged, which provides the wearer with a stable and comfortable visual viewing angle, and improves an AR viewing effect.

Embodiments of the present disclosure also disclose a head-mounted display device. The head-mounted display device includes a head-mounted component, a display part, a first cantilever arm, a second cantilever arm, and a synchronous transmission mechanism. The head-mounted component is configured to allow the head-mounted display device to be worn on a user's head. The display part includes a housing, and an optical imaging system at least partially accommodated in the housing. Each of the first cantilever arm and the second cantilever arm is rotatably connected to the head-mounted component and the housing. The synchronous transmission mechanism includes a middle transmission component, a first side transmission component, and a second side transmission component. The first side transmission component has a first end and a second end, and the second side transmission component has a third end and a fourth end. The first end and the third end are respectively rotatably connected to two ends of the middle transmission component, and the second end and the fourth end are respectively connected to the first cantilever arm and the second cantilever arm, so that the first cantilever arm and the second cantilever arm are rotatably connected synchronously with respect to the housing.

Optionally, each of the first side transmission component and the second side transmission component includes an end member and a transmission member. The end member has a first universal joint. Two ends of the transmission member are respectively provided with a second universal joint and a third universal joint. Each end of the middle transmission component is provided with a fourth universal joint. The first universal joint is connected to the second universal joint, and the third universal joint is connected to the fourth universal joint.

Optionally, a distance between the first end and the third end is less than a distance between the second end and the fourth end.

Embodiments of the present disclosure also disclose a head-mounted display device. The head-mounted display device includes a head-mounted component, a display part, a first cantilever arm, a second cantilever arm, and a synchronous transmission mechanism. The head-mounted component is configured to allow the head-mounted display device to be worn on a user's head. The display part includes a housing, and an optical imaging system at least partially accommodated in the housing. Each of the first cantilever arm and the second cantilever arm is rotatably connected to the head-mounted component and the housing. The synchronous transmission mechanism includes a middle transmission component, a first side transmission component, and a second side transmission component. Each of the first side transmission component and the second side transmission component includes an end member and a transmission member. A first end of the end member has a first universal joint. A second end of the end member is connected to one of the first cantilever arm and the second cantilever arm. The second end of the end member and one of the first cantilever arm and the second cantilever arm are rotatably connected to the housing. Two ends of the transmission member are respectively provided with a second universal joint and a third universal joint. Each end of the middle transmission component is provided with a fourth universal joint. The first universal joint is connected to the second universal joint, and the third universal joint is connected to the fourth universal joint.

Optionally, the synchronous transmission mechanism, the first cantilever arm and the second cantilever arm are rotatable synchronously with respect to the housing, and the synchronous transmission mechanism has no displacement with respect to the housing.

Optionally, the middle transmission component is a centrally symmetrical component.

Optionally, the first side transmission component and the second side transmission component are identical transmission components, and are arranged symmetrically.

Optionally, the synchronous transmission mechanism is arranged close to a wall of the housing. This allows more space for the optical imaging systems, chips, circuitry, etc.

The above description has been made for purposes of illustration and description. In addition, this description is not intended to limit the embodiments of the present disclosure to the forms disclosed herein. Although a plurality of example aspects and embodiments have been discussed above, certain variations, modifications, changes, additions, and sub-combinations thereof would occur to those skilled in the art.

What is claimed is:

1. A head-mounted display device, comprising:

a head-mounted component configured to provide a head wearing space;

a display part comprising a housing and a positioning base fixedly connected to the housing;

two cantilever arms having ends in a first direction respectively rotatably connected to two sides of the head-mounted component and ends in a second direction respectively rotatably connected to two sides of the housing; and a synchronous transmission mechanism comprising a middle transmission component accommodated in the housing and two side transmission components at least partially accommodated in the housing, wherein the positioning base is configured to be rotatably connected to the middle transmission component and prevent displacement of the middle transmission component relative to the housing, and the synchronous transmission mechanism is configured such that when one cantilever arm rotates, the synchronous transmission mechanism causes the other cantilever arm to rotate synchronously, wherein each of the two side transmission components comprises an end member and a transmission member;

the two end members are both rotatably connected to the housing, and the two end members are respectively connected to the two cantilever arms;

each transmission member is located between the middle transmission component and one of the two end members, and each transmission member is in transmission connection with the middle transmission component and one of the two end members; and each transmission member forms an included angle with the middle transmission component, and each transmission member forms an included angle with the end member adjacent thereto.

2. The head-mounted display device according to claim 1, wherein the two side transmission components are identical transmission components, and the two side transmission components are arranged symmetrically.

3. The head-mounted display device according to claim 1, wherein the end member has a first universal joint; two ends of the transmission member are respectively provided with a second universal joint and a third universal joint; each end of the middle transmission component is provided with a fourth universal joint; the first universal joint is connected to the second universal joint; and the third universal joint is connected to the fourth universal joint.

4. The head-mounted display device according to claim 3, wherein the first universal joint is connected to the second universal joint by a first cross shaft; and the third universal joint is connected to the fourth universal joint by a second cross shaft.

5. The head-mounted display device according to claim 1, wherein the end member has a first gear; two ends of the transmission member are respectively provided with a first bevel gear and a second bevel gear; each end of the middle transmission component is provided with a second gear;

the first gear is engaged with the first bevel gear; and the second bevel gear is engaged with the second gear.

6. The head-mounted display device according to claim 1, wherein the end member has a first synchronous belt pulley; each end of the middle transmission component is provided with a second synchronous belt pulley; and the transmission member includes a synchronous belt sleeved on the first synchronous belt pulley and the second synchronous belt pulley.

7. The head-mounted display device according to claim 1, wherein at least one of the end member and the transmission member of at least one of the two side transmission components, and the middle transmission component is connected to the housing by a damping component.

8. The head-mounted display device according to claim 1, wherein the two cantilever arms are movable relative to the end members in axial directions of the end members.

9. The head-mounted display device according to claim 1, wherein the head-mounted display device comprises a counterweight block, which is provided on one side of the housing in a width direction, and the counterweight block is located at a middle position on the housing in a length direction.

10. The head-mounted display device according to claim 1, wherein the head-mounted display device has a storage state and a use state;

in the use state, there is an included angle between the display part and a plane in which the two cantilever arms are located; and in the storage state, the display part is flipped to be located in the same plane as the two cantilever arms.

11. The head-mounted display device according to claim 1, wherein the head-mounted display device has a storage state, and in the storage state, the head-mounted display device is in one of the following states:

a main body of the display part and the two cantilever arms extend in a same direction; and the main body of the display part, the two cantilever arms, and the head-mounted component extend in a same direction.

12. The head-mounted display device according to claim 1, wherein the middle transmission component is a centrally symmetrical component.

13. The head-mounted display device according to claim 1, wherein the positioning base is connected to an inner wall of the housing, and the positioning base is provided with a clamping slot; and the middle transmission component comprises a shaft body rotatably clamped in the clamping slot.

14. The head-mounted display device according to claim 1, wherein the housing comprises a main wall and a side wall, the side wall being provided circumferentially around an edge of the main wall, and the positioning base being connected to the side wall.

15. A head-mounted display device, comprising:

a head-mounted component configured to allow the head-mounted display device to be worn on a user's head;

a display part comprising a housing and an optical imaging system at least partially accommodated in the housing;

a first cantilever arm and a second cantilever arm each being rotatably connected to the head-mounted component and the housing; and a synchronous transmission mechanism, comprising:

a middle transmission component accommodated in the housing and two side transmission components at least partially accommodated in the housing, wherein each of the two side transmission components comprises an end member and a transmission member;

the two end members are both rotatably connected to the housing, and the two end members are respectively connected to the first cantilever arm and the second cantilever arm;

each transmission member is located between the middle transmission component and one of the two end members, and each transmission member is in transmission connection with the middle transmission component and one of the two end members; and each transmission member forms an included angle with the middle transmission component, and each transmission member forms an included angle with the end member adjacent thereto.

16. The head-mounted display device according to claim 15, wherein a distance between the the two transmission members is less than a distance between the two end members.

17. The head-mounted display device according to claim 15, wherein the synchronous transmission mechanism, the first cantilever arm and the second cantilever arm are rotatable synchronously with respect to the housing, and the synchronous transmission mechanism has no displacement with respect to the housing.

18. The head-mounted display device according to claim 15, wherein the synchronous transmission mechanism is arranged close to a wall of the housing.

19. The head-mounted display device according to claim 15, wherein the end member has a first universal joint; two ends of the transmission member are respectively provided with a second universal joint and a third universal joint; each end of the middle transmission component is provided with a fourth universal joint; the first universal joint is connected to the second universal joint; and the third universal joint is connected to the fourth universal joint.

20. The head-mounted display device according to claim 19, wherein the first universal joint is connected to the second universal joint by a first cross shaft; and the third universal joint is connected to the fourth universal joint by a second cross shaft.

* * * * *